3,459,600
NOVEL ZINC COATING COMPOSITION AND METHOD
Rudolf P. Sedlak, Chicago, Ill., assignor to Todco Chemical Company, Inc., Chicago, Ill., a corporation of Illinois
No Drawing. Filed Nov. 7, 1966, Ser. No. 592,304
Int. Cl. C23f 7/10, 7/12
U.S. Cl. 148—6.16      7 Claims This invention relates to novel corrosion resistant protective coatings for zinc and ferrous surfaces, and more particularly to highly adherent phosphate coatings on zinc and ferrous surfaces, which coatings are particularly suited for the application of additional siccative coatings, such as paint, lacquer and the like. The combined coatings are more corrosion resistant than any heretofore known. Furthermore, the coatings are also finer grained, more dense, and consequently less absorbent of the siccative coatings subsequently applied thereto, thereby cutting the quantity of siccative coatings needed.

Acidic phosphate solutions, typically zinc or manganese, have been known since about 1917, and are in common use for coating either zinc or ferrous surfaces and occasionally both. Such solutions usually include phosphate ion, and manganese or zinc ion, and one or more of nickel, cobalt, copper, nitrate, fluoborate, fluosilicate, and/or fluoride ion. Such solutions, however, normally suffer from certain drawbacks. They are either insufficiently dense, and therefore extremely absorptive of the usual subsequently applied siccative coatings, or they are insufficiently corrosion resistant. Further, they have a tendency to flake off or peel off, when used in combination with such siccative coatings, particularly paint, upon flexing or bending of the phosphated piece.

An object of this invention is to provide a novel composition for forming a zinc phosphate coating on a zinc or a ferrous base.

Another object is to provide a composition of the above character which provides a more corrosion resistant coating than heretofore believed possible.

Still another object is to provide a composition of the above character which is of low absorptivity and very resistant to flaking or peeling, especially after further siccative coating is applied.

Another object is to provide a composition of the above character which can be used interchangeably without modification on either zinc or ferrous surfaces.

A further object is to provide a concentrate suitable for use in making the actual use solutions for the improved zinc phosphate coating of this invention.

A still further object is to provide a method for easily controlling the weight of the phosphate coating, within certain ranges.

Other objects of the invention will in part be obvious and will in part appear hereinafter.

It has now been found in accordance with the above objects that the use of amino tri-(methyl phosphonic acid) or one or more of its salts, usually the sodium or potassium salts, having the following formula:

FORMULA I

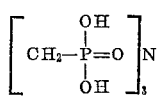

effects an improved phosphatizing composition. More particularly, it has now been found that a substantial improvement in a zinc coating composition is possible by utilizing 0.125 to 20% by weight of amino tri-(methyl phosphonic acid) or one of its salts, based on the weight of the phosphate ion, the actual amount being directly dependent upon the other ingredients utilized in said composition.

With higher concentration ranges of amino tri-(methyl phosphonic acid) there is a tendency to inhibit the phosphatizing process. However, the concentration of certain other ingredients very much affects the upper concentration limit of the amino tri-(methyl phosphonic acid) that can be used. For example, a larger amount of the amino acid can be used if the amount of fluoride ion is increased.

The other components of the zinc coating composition comprise about 0.5 to 5.0% phosphate ion, at least a sufficient quantity of zinc or manganese ion to form a dihydrogen salt with said phosphate ion, about 0.01% to about 1% of nickel or cobalt ion, or an admixture thereof, about 0.03% to about 1% of a fluoride ion, about 0.2 to 1.0% nitrate ion, and about 0.002% to 0.008% nitrite ion. The phosphate ion is generally derived from phosphoric acid. Usually, commercial grade acid (75%) is satisfactory.

The nickel or cobalt ion or mixture thereof may be introduced via their salts, such as sulphate, phosphate, or nitrate, and preferably carbonate.

The fluoride ion is preferably introduced in the form of hydrofluoric acid. However, fluoride salts which will not harm the action of the phosphate solution, such as sodium, potassium, zinc and manganese may be used. It might again be noted that the higher concentration ranges of fluoride permit use of greater amounts of amino tri-(methyl phosphonic acid). Such composition produces heavier, more dense coating, than previously.

The nitrate ion may be introduced as any of its soluble salts which will not interfere with the phosphatizing such as sodium, potassium, zinc, manganese, nickel, and preferably as the acid. The nitrite ion is almost always introduced at the point of use as the sodium salt.

It might be noted that the higher phosphate ion concentration generally produces a heavier coating, more quickly. Further, the effect of amino tri-(methyl phosphonic acid) is more pronounced in a higher phosphate ion concentration in that it effects much more dense and much tighter coatings in shorter times (10 to 15 seconds). Further, the optimum concentration of amino tri-(methyl phosphonic acid) drops as the phosphate ion concentration drops, although this is not necessarily a linear relationship.

It has been also ascertained that higher temperatures allow larger concentrations of the amino tri-(methyl phosphonic acid), and since increasingly large amounts of amino tri-(methyl phosphonic acid) result in finer, denser, coatings, limited only by the maximum concentration at which phosphatizing stops, this is desirable.

The use solutions of this invention may be applied to the surface by spraying, roller coating, atomizing on the surface of a preliminary heated surface, or by dipping the parts to be coated in a tank containing the solution. Solutions will form coatings in the range of about 120° to 180° F., but are preferably operated between 130° F. and 160° F., the best overall results being obtained at about 155° F. The part to be coated should be free of grease and dirt and the like, and may be prepared for coating by cleaning with alkali cleaners or solvent cleaners of the type which are generally in use today. After the coating is formed, it has been found advantageous to coat the pieces with an aqueous solution containing about 0.0257 to 0.1% chromic acid. Such treatment with chromic acid has been found to further increase the corrosion resistance of the coated piece.

The invention accordingly comprises the several steps an the relation of one or more of such steps with respect to each of the others thereof, and a composition of matter possessing the characteristics, properties, and the relation of components, which will be exemplified in the process and in the composition hereinafter described, and the scope of the invention will be indicated in the claims.

For a fuller understanding of the nature and objects of the invention, reference should be had to the following detailed description taken in connection with the accompanying examples:

Example I

An aqueous concentrate is prepared by admixing:

|   | Parts |
|---|---|
| Nickel fluoride ($NiF_2 \cdot 4H_2O$) | 4.0 |
| Nickel oxide (NiO) | 2.2 |
| Cobalt hydrate $Co(OH)_2$ | 2.0 |
| Zinc oxide (ZnO) | 7.0 |
| Phosphoric acid ($H_3PO_4$—75%) | 30.0 |
| Nitric acid ($HNO_3$—42° Bé.) | 10.0 |
| Water ($H_2O$) | 44.8 |

An operating solution of this concentrate is then made by diluting with water. On analysis, it will be found to contain:

|   | Percent |
|---|---|
| Nickel ion | 0.16 |
| Phosphate ion | 1.63 |
| Flouride ion | 0.05 |
| Zinc ion | 0.38 |
| Cobalt ion | 0.069 |
| Nitrate ion | 0.386 |

Portions of the resultant solution are then modified by adding 0.004% sodium nitrite and about 0.005% to 0.0257% of the amino tri-(methyl phosphonic acid) (ATMPA). Each of these solutions are then used to form coatings on 3 x 4 inch zinc galvinized coated steel panels. In so doing, solutions are heated to 155° F. and the panels are immersed for a period of 50 seconds. The various coating weights obtained for each solution are listed below:

Table 1

| Percent ATMPA: | Coating wt., mg./ft.² |
|---|---|
| 0.005 | 760 |
| 0.01 | 650 |
| 0.015 | 620 |
| 0.02 | 580 |
| 0.025 | No phosphatizing |

It should be evdient from Table 1 that increasing amounts of amino tri-(methyl phosphonic acid) decrease the coating weights. However, what is not evident from the table is that the quality of the coating increases.

Also what is not evident, is the fact that the coating density increases. Therefore, the absorptiveness of the coating decreases. Normally, in the past, the heavier coating weights were flaky, non-adherent, and very absorptive.

Example II

Another aqueous concentrate is prepared by admixing:

|   | Parts |
|---|---|
| Nickel oxide (NiO) | 4.0 |
| Cobalt hydrate $Co(OH)_2$ | 2.0 |
| Zinc oxide (ZnO) | 7.0 |
| Phosphoric acid ($H_3PO_4$—75%) | 30.0 |
| Nitric acid ($HNO_5$—42° Bé.) | 14.0 |
| Water ($H_2O$) | 47.0 |

An operating solution of this concentrate is then made by diluting it with water. To the resultant solution, sufficient sodium fluoride (NaF) is added to give a fluoride ion concentration of 0.03%.

Upon analysis, the solution will be found to contain:

|   | Percent |
|---|---|
| Nickel ion | 0.175 |
| Phosphate ion | 1.63 |
| Cobalt ion | 0.069 |
| Zinc ion | 0.38 |
| Nitrate ion | 0.386 |
| Flouride ion | 0.03 |

To this solution is further added 0.175% amino tri-(methyl phosphonic acid), and 0.004% sodium nitrite.

In use, such a solution will produce coating weights in the area of 300 to 350 milligrams per square foot with an immersion time of approximately 50 seconds at 155° F. in zinc coated steel panels.

To test the effectiveness of the coat, a plurality of such panels are subjected to a salt spray test along with panels treated in accord with the process and composition of U.S. Patent 2,835,617. All panels tested were first coated with the phosphatizing solution under identical conditions, then rinsed in the customary chromic acid rinse and coated with a single coat of a primer paint. The best example of the latter panels shows a corrosion resistance of approximately 250 hours whereas the panels of this example are sufficiently corrosion resistant to withstand 400 hours of salt spray without significant corrosion.

Example III

Another aqueous concentrate is prepared by admixing:

|   | Parts |
|---|---|
| Nickel fluoride ($NiF_2 \cdot 4H_2O$) | 4.0 |
| Nickel oxide (NiO) | 4.2 |
| Zinc oxide (ZnO) | 7.0 |
| Phosphoric acid ($H_3PO_4$—75%) | 30.0 |
| Nitric acid ($HNO_3$—42° Bé.) | 10.0 |
| Water ($H_2O$) | 44.8 |

An operating solution of the above is then made by diluting 3% by volume of it with water. To the resultant solution is added 0.075% amino tri-(methyl phosphonic acid), and about 0.004% sodium nitrite.

Example IV

Still another aqueous concentrate is prepared:

|   | Parts |
|---|---|
| Zinc oxide (ZnO) | 7.0 |
| Nickel carbonate ($NiCO_3$) | 4.0 |
| Cobalt hydrate $Co(OH)_2$ | 3.0 |
| Phosphoric acid ($H_3PO_4$—75%) | 30.0 |
| Nitric acid ($HNO_3$—42° Bé.) | 10.0 |
| Nickel fluoride ($NiF_2 \cdot 4H_2O$) | 2.5 |
| Water ($H_2O$) | 45.34 |
| Amino tri-(methyl phosphonic acid) | 0.8 |

Two parts of carbon dioxide evolved when the solution was made.

Example V

The following concentrate was prepared:

|   | Parts |
|---|---|
| $NiF_2 \cdot 4H_2O$ | 4.0 |
| NiO | 2.2 |
| $Co(OH)_2$ | 2.0 |
| ZnO | 7.0 |
| $H_3PO_4$ (75%) | 30.0 |
| $HNO_3$ (42° Bé.) | 10.0 |
| Amino tri-(methyl phosphonic acid) | 0.35 |
| $H_2O$ | 44.45 |

In the examples above, "seediness"—that phenomena evidenced by small areas of concentrated coating—is also not evident. Indeed, a unique evenness in coat thickness is observed.

The mechanism involved in the improved reaction is not fully understood, but it is believed that the amino tri-(methyl phosphonic acid) or its soluble salts (sodium, potassium, magnesium, zinc and the like) control both the action of the acidic medium ($H_3PO_4$) as well as the oxidizer ($HNO_3$) in the composition. Normally, both eat into the base sheet with deposition of the inert zinc phosphate $Zn(H_2PO_4)_2$ coat. With such deposition, there is a decrease in acidity. Thus, as the reaction proceeds, it becomes less active. If one attempts to increase the acidity of the reaction media, only a deleterious result occurs.

The zinc phosphate coat becomes less inert because it is more soluble in an acid medium. The amino tri-(methyl phosphonic acid) seems to take the place of the acid without the disadvantage of increased acid content. The zinc phosphatizing composition now attacks the surface of the base sheet while at the same time depositing an inert zinc phosphate coat which is not attacked by the higher acid because none is formed.

It will thus be seen that the objects set forth above, among those made apparent from the preceding description, are efficiently attained, and, since certain changes may be made in carrying out the above method and in the above composition of matter without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described:

What is claimed is:

1. An aqueous zinc phosphate coating composition having as essential ionic ingredients therein about 0.5% to 4.0% by weight phosphate ion, about 0.2% to 1.0% nitrate ion, about 0.1% to 1.0% of an ion selected from the group consisting of nickel and cobalt ions, at least a sufficient amount of an ion selected from the group consisting of zinc ion and manganese ions to form zinc or manganese dihydrogen phosphate, about 0.03% to 1.0% fluoride ion, and, as a compound, about 0.125% to 20% amino tri-(methyl phosphonic acid) based on the phosphate ion concentration, and about 0.002% to 0.008% nitrite ion.

2. The zinc phosphate coating composition of claim 1 wherein said ion forming the dihydrogen phosphate comprises zinc.

3. The zinc phosphate coating composition of claim 1 wherein said nickel and said cobalt ion are in admixture.

4. A method for coating clean zinc and ferrous surfaces with a dense, even zinc or mangenese phosphate coating comprising the application of a composition having as essential ionic ingredients therein about 0.5% to 4.0% by weight phosphate ion, about 0.2% to 1.0% nitrate ion, about 0.1% to 1.0% of an ion selected from the group consisting of nickel and cobalt ions, at least a sufficient amount of an ion selected from the group consisting of zinc ion and manganese ions to form zinc or manganese dihydrogen phosphate, about 0.03% to 1.0% fluorine ion, and, as a compound, about 0.125% to 20% amino tri-(methyl phosphonic acid) based on the phosphate ion concentration, and about 0.002% to 0.008% nitrate ion, preferably at a temperature of 120° to 180° F.

5. The method of claim 4 having as an additional step the coating of the resultant surface with an aqueous solution containing about 0.0257 to 0.1% chromic acid.

6. The method of claim 4 wherein said application is by dipping.

7. The method of claim 4 wherein said application is by spraying.

References Cited

UNITED STATES PATENTS

| | | |
|---|---|---|
| 2,311,306 | 2/1943 | Ritchey. |
| 2,835,617 | 5/1958 | Maurer _____ 148—6.15 |
| 3,192,039 | 7/1965 | Herbst et al. _____ 148—6.15 X |
| 3,200,004 | 8/1965 | Herbst et al. _____ 148—6.15 X |
| 3,293,088 | 12/1966 | Herbst et al. _____ 148—6.15 |

RALPH S. KENDALL, Primary Examiner

U.S. Cl. X.R.

148—6